(12) United States Patent
Herslow

(10) Patent No.: US 9,569,718 B2
(45) Date of Patent: Feb. 14, 2017

(54) CARD WITH METAL LAYER AND ELECTROSTATIC PROTECTION

(71) Applicant: John Herslow, Scotch Plains, NJ (US)

(72) Inventor: John Herslow, Scotch Plains, NJ (US)

(73) Assignee: COMPOSECURE, LLC, Somerset, NJ (US)

( * ) Notice: Subject to any disclaimer, the term of this patent is extended or adjusted under 35 U.S.C. 154(b) by 228 days.

(21) Appl. No.: 14/134,436

(22) Filed: Dec. 19, 2013

(65) Prior Publication Data

US 2015/0180229 A1    Jun. 25, 2015

(51) Int. Cl.
| | |
|---|---|
| G06K 19/06 | (2006.01) |
| G06K 19/077 | (2006.01) |
| B32B 37/24 | (2006.01) |
| B32B 38/06 | (2006.01) |

(52) U.S. Cl.
CPC ... *G06K 19/07749* (2013.01); *G06K 19/07735* (2013.01); *B32B 38/06* (2013.01); *B32B 2037/243* (2013.01); *B32B 2307/202* (2013.01); *B32B 2307/206* (2013.01); *B32B 2311/00* (2013.01); *B32B 2425/00* (2013.01); *Y10T 156/10* (2015.01)

(58) Field of Classification Search
USPC .......................... 235/487, 488, 492, 493, 494
See application file for complete search history.

(56) References Cited

U.S. PATENT DOCUMENTS

| | | | | |
|---|---|---|---|---|
| 2010/0116891 | A1* | 5/2010 | Yano | G11B 5/80 235/488 |
| 2012/0325914 | A1* | 12/2012 | Herslow | B32B 37/02 235/488 |

* cited by examiner

*Primary Examiner* — Michael G Lee
*Assistant Examiner* — Tabitha Chedekel
(74) *Attorney, Agent, or Firm* — Henry I. Schanzer

(57) ABSTRACT

A metal card or a hybrid metal-plastic includes an acrylic resin protective clear-coat layer and/or a "hard" nano-particle top-coat layer overlying any exposed metal surface in order to insulate the metal and reduce the likelihood of an electrostatic discharge (ESD) or a short circuit condition. In a particular embodiment the "hard" nano-particle top-coat layer overlies the clear coat layer. The dual stage protective layers which include a clear-coat layer and a top-coat layer ensure that the problem associated with an ESD and/or a short circuit condition is minimized. In addition, the dual stage protection imparted to a card by forming a clear-coat layer and a top-coat layer ensures that any card surface treatment or card decoration is protected over time from excessive wear or scratching due to use in conjunction with a POS device and/or handling.

24 Claims, 9 Drawing Sheets

CARD WITH METAL LAYER AND ELECTROSTATIC PROTECTION

BACKGROUND OF THE INVENTION

This invention relates to the manufacture of cards with electrostatic protection where the cards include a metal layer.

The term "card" or "cards" as used herein, and in the appended claims, is intended to include a large variety of documents and instruments such as transactional (financial or credit) cards, identification (including National ID or Driver's License) cards, electronic passport pages, gift cards, documents for holding permanent and long lasting records such as medical records or security cards, or other cards used for promotion of a product or organization.

The manufacture of cards formed solely of a metal layer is known. These cards are intended to provide an indication of status and/or bestow a degree of prestige to the user. However, they are generally much more expensive to manufacture than the ubiquitous "plastic" cards.

Due to the prestige associated with the metal cards, it has become desirable to many users to have a "metal" card. However, the cost of manufacturing metal cards makes it uneconomical and hence undesirable in many applications. As a compromise, Applicant proposed in co-pending application titled Combination Card of Metal and Plastic bearing Ser. No. 13/135,139 the making of cards which include at least one metal layer and at least one plastic layer. Such a card, which may be referred to herein and in the appended claims as a "hybrid-card", is generally cheaper to make than a pure metal card and would also have some advantages such as the ease with which information may be formed on the plastic layer including the magnetic stripe, hologram and signature panel.

In co-pending application Ser. No. 13/135,139, Applicant addressed and resolved some of the major problems which exist in the manufacture of a hybrid card (i. e., one having a metal layer and a plastic layer) since the normally different responses of the plastic and metal layers to temperature and stress tend to cause the card to warp and/or delaminate. Consequently, the manufacture of hybrid cards is more attractive.

In brief, it is desirable to have or to make "metal" or "hybrid" cards; where the "metal" cards are either wholly or mostly comprised of metal and the "hybrid" cards include at least one metal layer and one plastic layer.

However, there are significant problems with the handling of metal and hybrid cards and their use in point of sale (POS) equipment. The presence of any metal layer may cause an ESD event or a short circuit. It is known that electronic circuitry in point of sale (POS) devices, used to execute financial transactions, are sensitive and susceptible to electro-static discharge (ESD) events caused by the transfer of electrostatic charge from the card-holder and financial transaction card to the POS device itself. In fact the problem of electrostatic discharge is known to plague the Credit/Debit card industry The presence of any metal on the financial card increases the likelihood of such an ESD event. The ESD type of event can reset or damage the electronics in the POS device. Due to this phenomenon, a metal card or any card containing a metal layer of virtually any thickness [e.g., greater than 0.001" thick] can lead to catastrophic failure of the POS device or any like device in certain environments (e.g., cold, low humidity environments).

Therefore, it is an object of this invention to manufacture metal cards and or hybrid cards (i.e., cards having at least one metal layer and at least one plastic layer) with electrostatic discharge and/or short circuit protection.

In the discussion to follow, including the appended claims, reference is made to metal layer(s) for ease of reference. It should be understood that the metal layer may be any layer of electrically conductive material, as is normally the case with metals.

SUMMARY OF THE INVENTION

In accordance with the invention, in order to minimize the likelihood of an ESD event (or a potential short circuit), a "metal" card or a "hybrid" having a metal layer with an exposed top surface (also referred to herein as an "inner" surface) or a bottom surface (also referred to herein as an "outer" surface) includes a protective coating overlying the exposed top and/or bottom surface of the metal layer in order to insulate the exposed metal surface and prevent it from directly touching another surface. Insulating the surfaces of the metal layer reduces the possibility of an ESD or causing a short circuit condition when the card is inserted or removed from a POS device or any like device.

The protective coating includes a layer (coat) of clear resin and/or a layer of a "hard" material which would also provide resistance against wear and tear and scratching. The protective may include either or both types of layers.

In a particular embodiment of the invention there is included a coat of clear resin overlying the exposed metal surface and a "hard" top-coat layer overlying the clear coat layer. The dual stage protective layers which include a clear-coat layer and a hard top-coat layer ensure that the problem associated with an ESD and/or a short circuit condition is minimized. In addition, the dual stage protection imparted to a card by forming a clear-coat layer and a top-coat layer ensures that any card surface treatment or card decoration is protected over time from excessive wear due to use in conjunction with a POS device and/or during its handling.

A hybrid card embodying the invention typically includes: (a) a first assembly comprised of multiple plastic layers which have been laminated at a first temperature and pressure; (b) a second assembly comprised of a metal layer which is laminated with the first assembly at a second temperature and pressure; and (c) a protective layer which includes at least one, or both of: (i) a clear coat layer of resin overlying the metal layer; and (ii) a hard top coat layer overlying the metal layer.

Alternatively, the protective layer may be formed to include a clear coat layer overlying the metal layer and a top coat layer overlying the clear coat layer.

A hybrid card embodying the invention may also include a top coat layer and/or a clear coat layer overlying the plastic layers.

A card embodying the invention may include: (a) an electrically conductive (e.g., metal) core layer and (b) a protective coating which may be comprised of: (i) clear coat layers overlying the top and bottom surfaces of the core layer; and/or (ii) hard top coat layers overlying the top and bottom surfaces of the core layer. Alternatively the protective coating includes clear coat layers overlying the top and bottom surfaces of the core layer and hard top coat layers overlying the clear coat layers.

The clear coat layer may be formed of an acrylic resin (i.e., any of numerous thermoplastic or thermosetting polymers or copolymers of acrylic acid, methacrylic acid, any esters of these acids, or acrylonitrile), ultra violet (UV) curable resin blend including polyester, urethane, diol and carboxyl acrylates with ceramic particles, multifunctional acrylate polymers or any like material. The clear coat resin layer may be applied (or formed) by spraying, screen printing, painting, powder coating or any other like method, and cured (processed) by UV cure, electron beam curing, oven heat, or any radiation curing method or in any other suitable manner.

The "hard" top coat layer may be formed of electrically non-conductive nano-particles (e.g., silicon or ceramic particles or particles of any hard electrically non-conductive materials, also including polymeric (acrylic) carriers of nano-particles which may, but need not, be in a polymeric radiation cured vehicle.

The hard top coat nano-particle layer may be applied (or formed) by atomizing, spraying, painting, roll coating, screen printing, thermal transfer or any like suitable method and processed by conventional automotive type spray guns, brushes, screen print equipment, roll lamination and any like suitable method.

A method for making a hybrid card embodying the invention includes the steps of: (a) laminating multiple plastic layers together under preselected pressure and temperature conditions to reduce subsequent dimensional changes and to form a first "plastic" assembly which is dimensionally stable; (b) forming a second assembly which includes the first "plastic" assembly and a metal layer with an adhesive layer between the plastic assembly and the metal layer; (c) subjecting the second assembly to a lamination process under predetermined temperature and pressure condition; and (d) applying a clear coat resin layer or a hard top coat layer over the metal layer to insulate the metal layer and prevent the metal layer from making direct contact with any other surface to reduce electrostatic discharge (ESD) problems.

Alternatively, the method includes applying a clear coat resin layer over the metal layer to insulate the metal layer and the additional step of applying a hard coat top layer over the clear coat layer for increasing the level of insulation and improving the hardness and resistance to wear of the surface of the card.

A method for making a metal card embodying the invention includes the steps of: (a) preparing and treating a metal core layer, including providing appropriate cut-outs, to make the core layer suitable for its intended use; and (b) applying a clear coat resin layer or a hard top coat layer over the metal layer to insulate the metal layer (core) and prevent the metal layer from making direct contact with any other surface to reduce electrostatic discharge (ESD) problems.

Alternatively, the method includes applying a clear coat resin layer over the metal layer to insulate the metal layer and the additional step of applying a hard coat top layer over the clear coat layer for increasing the level of insulation and improving the hardness and resistance to wear of the surface of the card.

BRIEF DESCRIPTION OF THE DRAWINGS

In the accompanying drawings, which are not drawn to scale, like reference characters denote like components, and.

DETAILED DESCRIPTION OF THE INVENTION

As already noted electrostatic discharge (ESD) protection is required for any card having a metal layer (i.e., having an electrically conductive layer). Such cards may be of the type defined herein as hybrid cards (i.e. having at least one layer of metal and one layer) or mostly metal (i.e., having a metal core). The cards of interest in practicing the invention may take many forms, as discussed below.

Figure 1A:
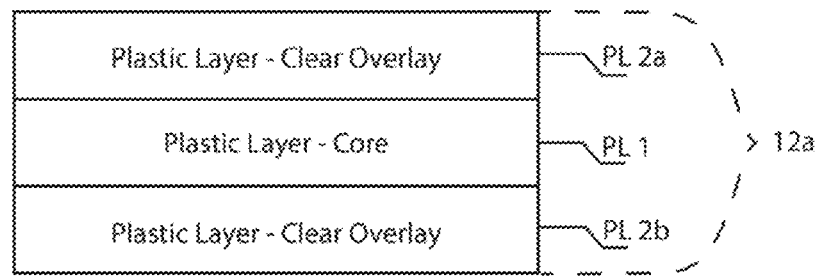
FIG. 1A is highly simplified cross-sectional diagram of a first "plastic" assembly used to practice the invention.

Referring to (highly simplified) FIG. 1A there is shown a core plastic layer PL1 with a clear overlay plastic layer PL2a, above layer PL1, and a clear overlay plastic layer PL2b, below layer PL1. This structure accommodates the application of print matter (e.g., information or decoration) on the top surface of the PL1 core layer (as illustrated by printed offset layer 121b shown in FIG. 1B) and/or on the bottom surface of the clear overlay PL2a facing the top surface of the PL1 core layer. This structure enables the printed information to be protected by the clear overlay(s) and to be visible through the clear overlay plastic layers (e.g., PL2a).

After being collated these three layers (PL2a, PL1 and PL2b) of plastic material are laminated together to form a first assembly 12 (or 12a). The use of three layers is by way of example only. The first assembly 12 (or 12a) can be formed of only two plastic layers or of more than three plastic layers. The plastic layers may be of polyvinyl chloride (PVC), Polyethylene terephthalate (PETG), Poly carbonate (PC) or any like plastic material which can be bound together by any appropriate adhesive layer.

In one embodiment, the (two or more) plastic layers, forming the first assembly 12, are laminated together using known laminating equipment under a platen temperature which is typically in the range of 300 to 350 degrees Fahrenheit at an absolute pressure ranging between 200 to 400 pounds per square inch absolute. The significance of first laminating the plastic layers together is to stress relieve the plastic; rendering it dimensionally stable. The first plastic assembly 12 (or 12a), comprised of the various plastic layers, is processed (e.g., pre-shrunk) under selected pressure and temperature conditions to reduce subsequent dimensional changes. Note that the range of temperature and pressure noted above is by way of example only and may be significantly expanded to make the desired product.

Figure 1B:
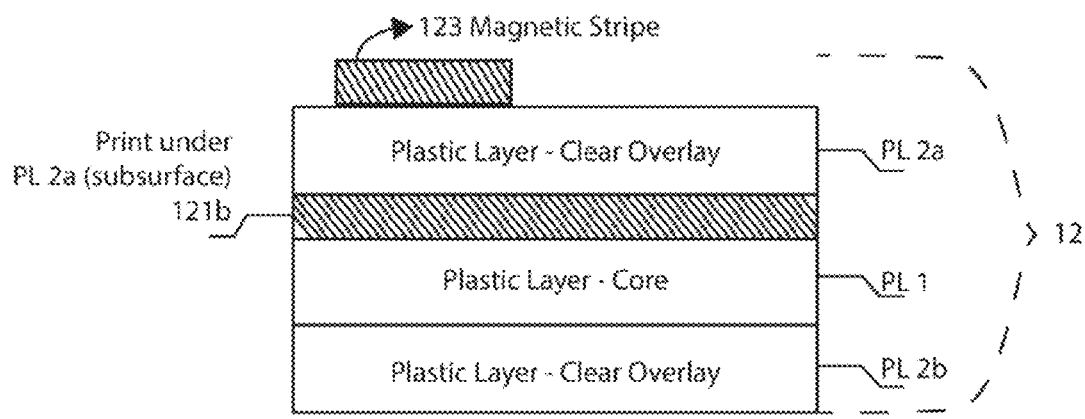
FIG. 1B is a simplified cross-sectional diagram of a first "plastic" assembly used to practice the invention showing the addition of printing matter and a magnetic stripe.

Referring to FIG. 1B which is also a simplified cross-sectional diagram of a first "plastic" assembly 12, there is shown offset print layer 121b containing information or decorative matter as discussed above. In addition, there is also shown a magnetic stripe 123 which is attached to the outer surface of layer PL2a. Note that the magnetic stripe 123 may be attached to the outer surface of layer PL2a (in any suitable manner) prior to the lamination step. Thus, the magnetic stripe may be laminated together with the plastic layers (PL2a, PL1, PL2b) to form the first plastic assembly 12.

Figure 1C:
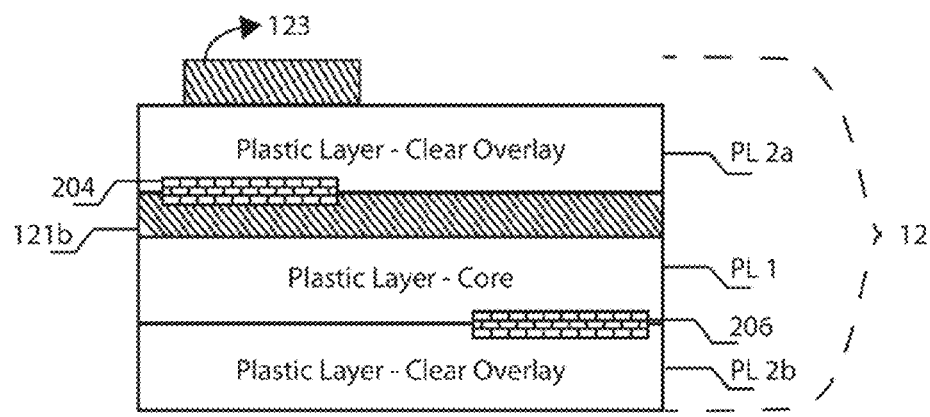
FIG. 1C is a simplified cross-sectional diagram of a first "plastic" assembly used to practice the invention showing the addition of RFID chips between the plastic layers prior to lamination of the first assembly.
Figure 1D:
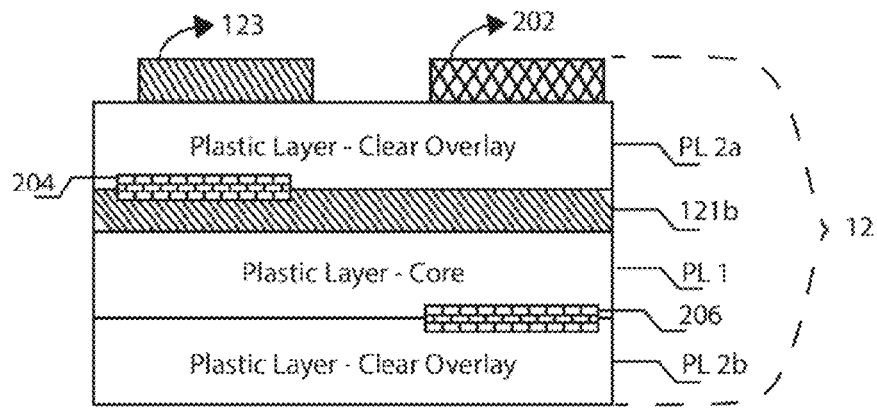
FIG. 1D is a simplified cross-sectional diagram of he plastic assembly of FIG. 1C with the addition of a contact chip.

Referring to FIGS. 1C and 1D which are also simplified cross-sectional diagrams of a first "plastic" assembly 12, there is shown the insertion of an RFID chip 204 between plastic layers PL2a and PL1 and an RFID chip 206 between plastic; layers PL1 and PL2b. The RFID chips would typically be inserted between the plastic layers prior to the lamination of the plastic layers forming the first assembly and would thus be under (below) the outer surfaces of the top plastic layer.

FIG. 1C is a simplified cross-sectional diagram of a first "plastic" assembly illustrating that a first assembly 12 can include the plastic layers, an offset print layer 121b. RFID chips and a magnetic stripe and that this assembly is subjected to a lamination step, as described above. An inductive coupling antenna, as shown on layer 12 in FIG. 6A, or transponder (RFID chip connected to an antenna structure) can be integrated into the stack up of the card construction. In addition, a ferrite layer may be used to offset the effects of eddy current in the metal layer and such ferrite layer can be used to direct or enhance the electromagnetic field concentration.

FIG. 1D is a simplified cross-sectional diagram of a first "plastic" assembly showing the addition of a contact chip 202 to the first assembly 12, after the first assembly has undergone lamination.

Figure 2A:
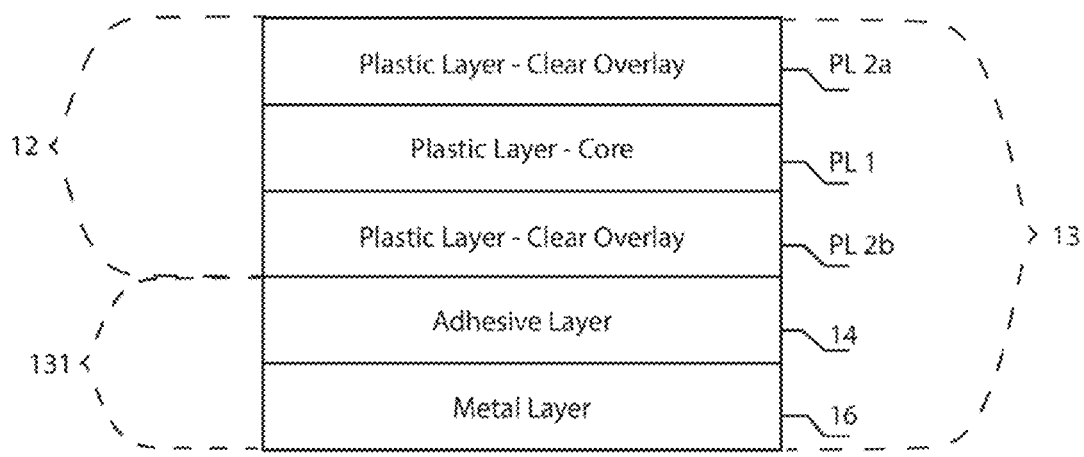
FIG. 2A is a highly simplified cross-sectional diagram of a first plastic assembly of the type shown in FIG. 1A combined with a second assembly having a metal layer used to practice the invention.
Figure 2B:
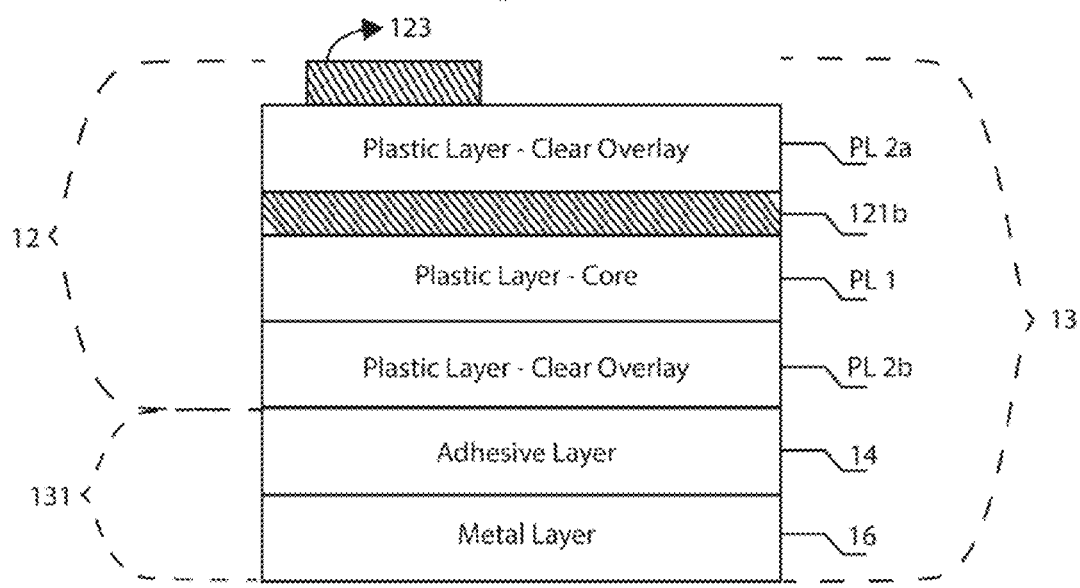
FIG. 2B is a simplified cross-sectional diagram of the embodiment shown in FIG. 2A with the additional showing of a magnetic stripe and printed information to a plastic layer.
Figure 2C:
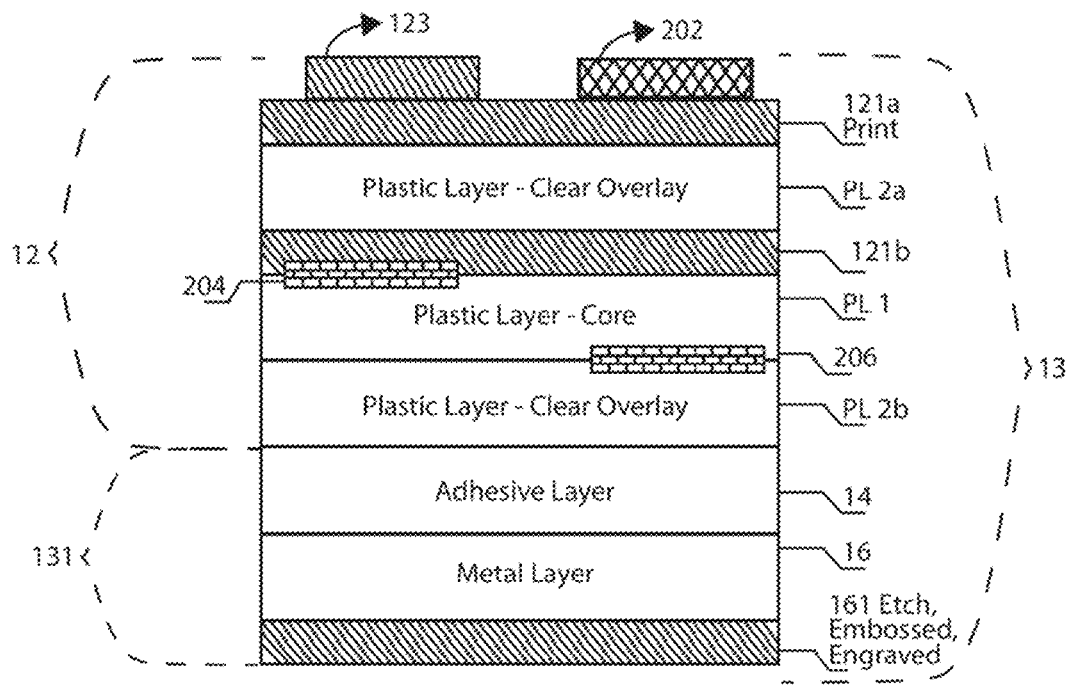
FIG. 2C is a simplified cross-sectional diagram of the assembly shown in FIG. 2B with the additional showing of RFID and contact chips and the addition of information to the "top" plastic layer and the etching, embossing or engraving of the "bottom" metal layer.

Referring to FIGS. 2A, 2B, and 2C, there is shown a second assembly 13 comprised of a first assembly 12 and a second sub-assembly 131, where subassembly 131 is comprised of an adhesive layer 14, and a metal layer 16. The adhesive layer 14 may be, for example, waytech w39, or thermoplastic polyurethane, or any suitable adhesive. The metal layer 16 may be, for example, stainless steel, brass, copper, aluminum, or any suitable material. The metal layer 16 may be a clad metal layer which can constitute more than one metal layer.

FIG. 2A is a highly simplified illustration of a previously laminated first "plastic" assembly 12 attached to a metal layer 16 via an adhesive layer and where the combination is subjected to a (second) lamination to form a second assembly 13.

FIG. 2B is similar to FIG. 2A but shows the first assembly 12 to include a magnetic stripe 123 and a print layer 121b under layer PL2a or above layer PL1.

The second assembly 13 is laminated under a platen temperature which is typically 20-to-30 degrees Fahrenheit below the temperature to which the first assembly was subjected at an absolute pressure ranging between 200 to 400 pounds per square inch absolute. Maintaining the temperature of the laminating step of the second "metal-plastic" assembly 13 below that of the first "plastic" assembly 12 ensures that the plastic assembly does not get delaminated and/or, subjected to dimensional changes. It is a characteristic of plastics that they retain physical memory of the highest temperature at which they have been tempered. Thus, the plastic layers of the first assembly retain their dimensional stability until it is subjected to a temperature which exceeds the prior highest temperature applied to it. By laminating the second assembly 13, comprised of the first assembly 12 and sub-assembly 131, at a lower temperature than the laminating temperature of the first assembly, the dimensional stability of the assembly is maintained and there is substantially no warpage of the plastic and metal layers.

FIG. 2C, is intended to show that after lamination of the second assembly 13 an outer surface or region 161 of metal layer 16 may be etched, embossed or engraved (coined and debossed) with any personalized information or decorated with any pattern. In addition FIG. 2C is intended to show that an offset printed layer 121a may be attached or formed on the outer surface of plastic layer PL2a. In FIG. 2C, a magnetic stripe 123 is shown attached to the outer (external) surface of layer PL2a. Also shown are RFID chips 204 and 206 placed between selected plastic layers.

Referring to FIGS. 2C and 1D there is shown a contact chip 202 placed on the top region of plastic layer PL2a by forming a cavity on, and within, the outer surface of plastic layer PL2a of the card. A cavity may be formed by milling (or any other suitable operation) and inserting a contact chip within the cavity. The contact chip will generally be flush with the plastic surface and can be visible, although it could also be placed along the outer surface of layer PL2a. The contact chip 202 is typically added after the card is finished, but it can be inserted or placed before or after the lamination processes of the first and second assemblies.

As noted above the metal layer 16 can be the cause of a short circuit or of electostatic discharge (ESD) when a card containing the metal layer is inserted or withdrawn from a POS device and indeed the use of metal cards present a significant problem. This problem is overcome in cards embodying the invention as described below.

Figure 3:
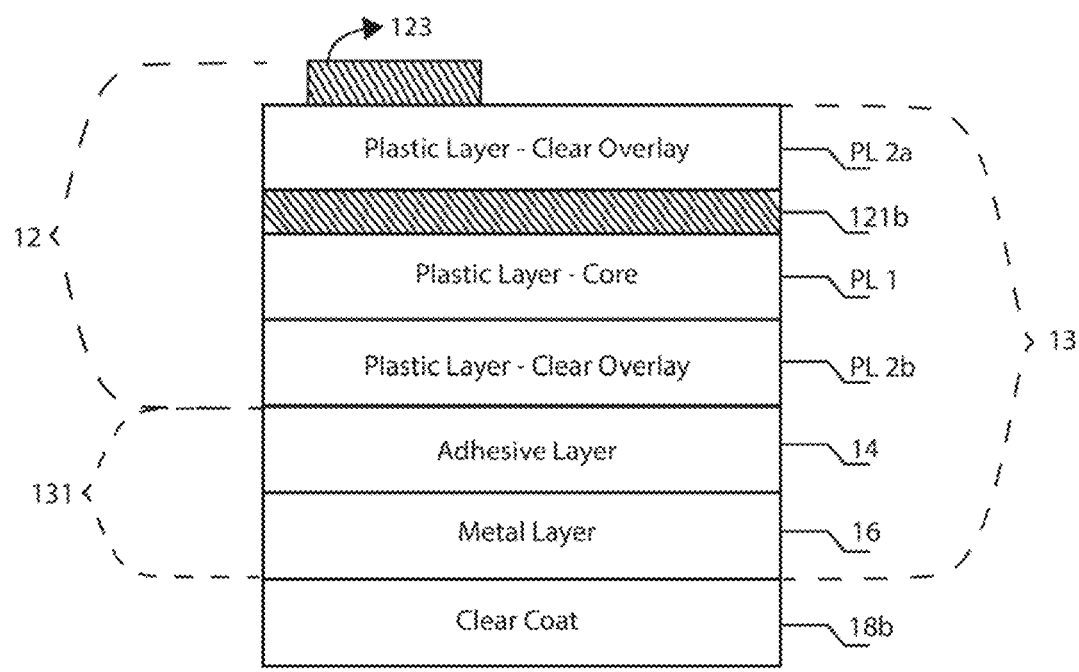
FIG. 3 is a simplified cross-sectional diagram illustrating the addition of a clear coat layer overlying the external surface of the metal layer in accordance with the invention.
Figure 3A:
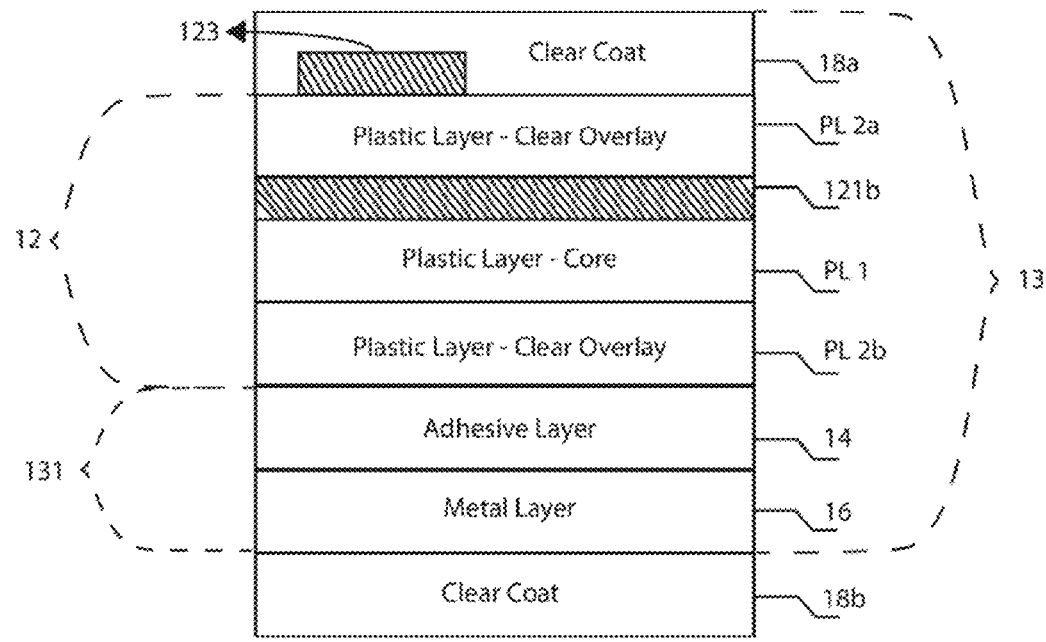
FIG. 3A is a simplified cross-sectional diagram illustrating the addition of clear coat layers overlying the external top and bottom surfaces of a card assembly, in accordance with the invention.

Referring to FIG. 3, note that a clear coat resin layer 18b is attached or applied to the outer surface of metal layer 16. The clear coat layer 18b insulates the metal layer and prevents it from directly contacting any other surface. Thus, it functions to insulate the surface of the metal layer from making contact with a POS device (when a card containing the metal layer is inserted therein or withdrawn therefrom) thereby preventing ESD and/or short circuit conditions. In FIG. 3A a clear coat resin layer 18b is shown applied to the surface of the metal layer 16 and a like clear coat layer is shown applied to the top surface of plastic overlay layer PL2a which produces a symmetrical structure.

As noted above, the clear coat layer (18a, 18b) may be formed of an acrylic resin (i.e., any of numerous thermoplastic or thermosetting polymers or copolymers of acrylic acid, methacrylic acid, any esters of these acids, or acrylonitrile), ultra violet (UV) curable resin blend including polyester, urethane, diol and carboxyl acrylates with ceramic particles, multifunctional acrylate polymers or any like material. The clear coat resin layer may be applied (or formed) by spraying, screen printing, painting, powder coating or any other like method, and cured (processed) by UV cure, electron beam curing, oven heat, or any radiation curing method or in any other suitable manner. The thickness of each one of the clear coat resin layers may range from 3 microns to 25 microns, or more. The minimum thickness is to ensure that the metal layer is fully covered.

Figure 3B:
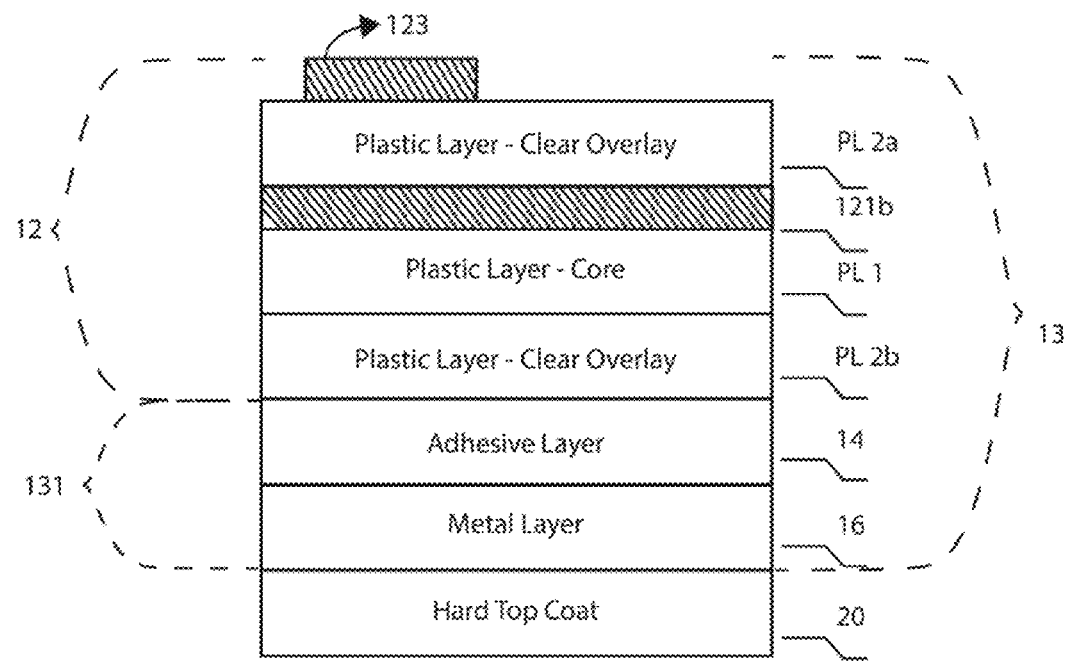
FIG. 3B is a simplified cross-sectional diagram illustrating the addition of a single hard top coat layer overlying the external surface of the metal layer in accordance with one aspect of the invention.

FIG. 3B illustrates that a "hybrid" card embodying the invention can be made with a single hard top coat layer 20 overlying the external, exposed, surface of metal layer 16. This layer 20 can provide electrical insulation and abrasion protection for the underlying metal layer. Thus, either a single clear coat or a single hard coat layer may be used to insulate the external, exposed, surface of metal layer 16.

Figure 4:
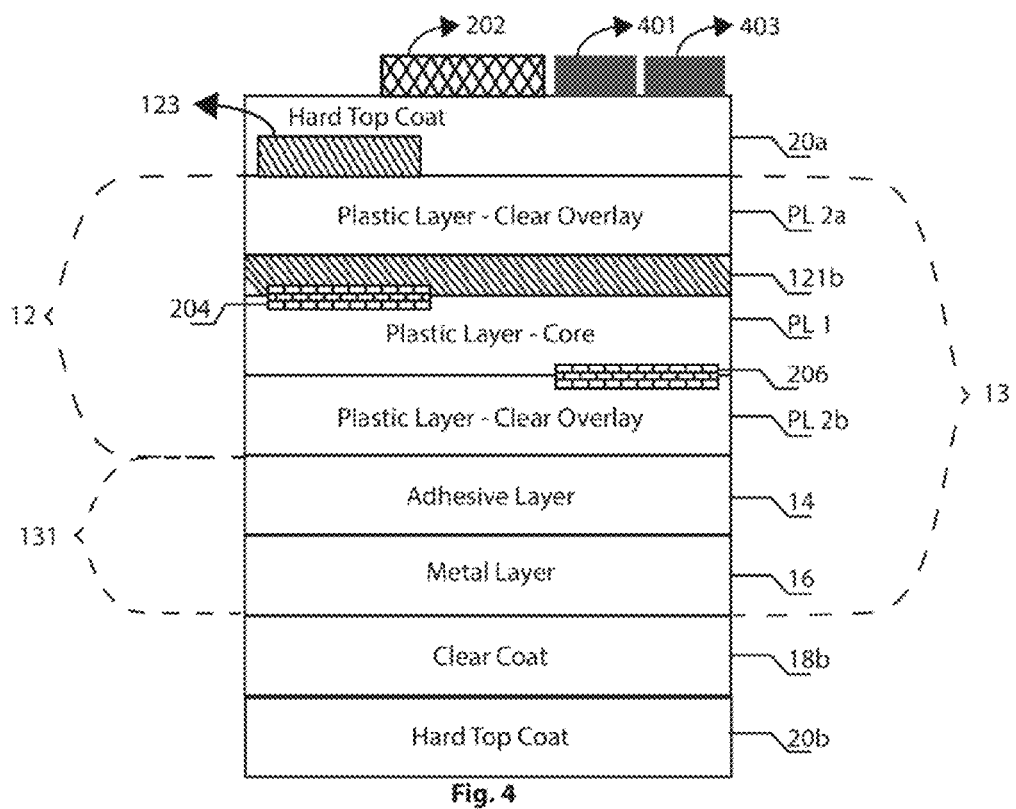
FIG. 4 is a simplified cross-sectional diagram illustrating the addition of a clear coat layer overlying the exposed surface of a metal layer and a first hard top coat layer overlying the clear coat layer and a second hard top coat layer overlying the exposed surface of the top plastic layer of the card assembly, in accordance with the invention.
Figure 4A:
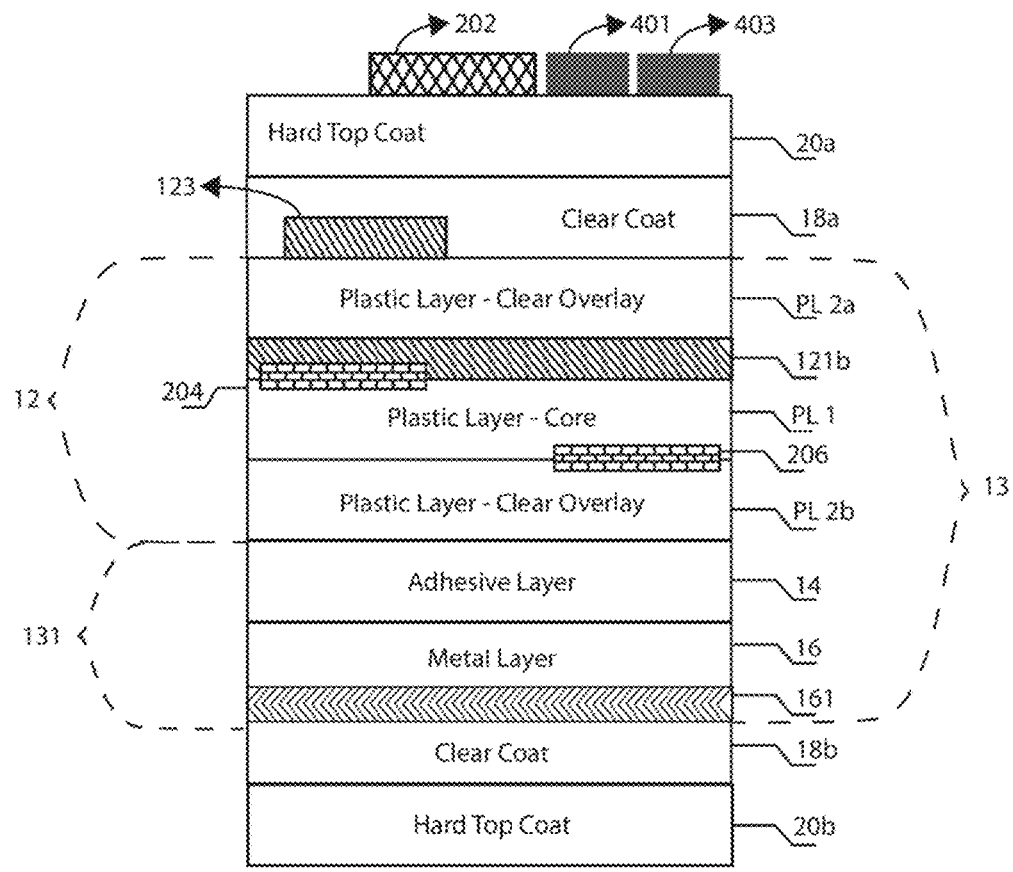
FIG. 4A is a simplified cross-sectional diagram illustrating the addition of clear coat layers and hard top coat layers to a card assembly of the type shown in FIG. 2C.

In FIGS. 4 and 4A there is shown a clear coat layer 18b overlying the metal layer 16 and a "hard" top coat layer 20b which overlies the clear coat layer 18b. The top coat layer 20b functions to add another layer of insulation, in addition to the clear coat, to the metal layer 16. In FIG. 4 there is also shown a single hard coat layer 20a overlying the outer, external, surface of layer PL2a of the plastic assembly. The hard coat layers 20a, 20b provide wear and tear protection and reduce the scratching or marring of the underlying surfaces. In FIG. 4, a contact chip 202, a signature panel 401 and a hologram 403 are shown attached and secured to the top of hard coat 20a.

FIG. 4A is similar to FIG. 4 except that, in this configuration, the clear coat layers and the top coat layers are symmetrically applied to the top and bottom surfaces of the card assembly. Thus, a clear coat layer 18a overlies layer PL2a and a clear coat layer 18b overlies metal layer 16. The "hard" top coat layer 20a overlies layer 18a and the "hard" top coat layer 20b overlies layer 18b.

As noted above, the "hard" top coat layer (20a 20b) may be formed of electrically non-conductive nano-particles (e.g. silicon or ceramic particles or particles of any hard electrically non-conductive materials, also including polymeric (acrylic) carriers of nano-particles which may, but need not, be in a polymeric radiation cured vehicle. The hard top coat nano-particle layer may be applied (or formed) by atomizing, spraying, painting, roll coating, screen printing, thermal transfer or any like suitable method and processed by conventional automotive type spray guns, brushes, screen print equipment, roll lamination and any like suitable method.

By way of example, the thickness of each one of said top coat layers (20a, 20b) is typically in the range of 1.5 to 15 microns.

Note that a signature panel 401, a hologram 403 and a contact chip 202 can be attached to the card assembly as shown in FIGS. 4 and 4A.

It has thus been shown that cards embodying the invention may be formed with just a clear coat (e.g., 18b) overlying the exposed surface of a metal layer or with just one "hard" top coat layer (e.g., 20b) overlying the exposed metal layer. Alternatively, a hard coat layer may be applied so as to overlie a clear coat. In addition, it has been shown that a clear coat and/or a hard top coat may be applied to the exposed surface of the plastic assembly. Protecting the major card surfaces of a card from wear and tear and abrasion is highly advantageous.

Hybrid cards bearing ESD protection, as described above, have a stable structure and the various layers do not delaminate. Cards embodying the invention may be manufactured by combining various subassemblies. The subassemblies can be formed so as to optimize their properties and characteristics as further discussed below.

Hybrid cards embodying the invention include a first plastic subassembly 12 attached to a metal layer subassembly 131 to which is then attached a clear coat to which is then attached a hard top coat layer. Although this is advantageous, for purpose of economy hybrid cards can also be formed with only a clear coat or a top coat attached to exposed surface of the metal layer.

Hybrid cards embodying the invention may be formed in a series of steps. The first step includes the lamination of two or more plastic layers and pre shrinking these layers to form a first assembly 12. Typically, the magnetic stripe 123 is attached to the outer PVC layer, PL2a, prior to the first lamination. The second step includes: (a) the formation of a sub assembly 131 comprised of an adhesive layer 14 attached to a metal layer 16; and (b) the lamination of the first assembly 12 with subassembly 131 to form assembly 13. The third step includes the application of a clear coat layer 18 to the metal layer 16 or the application of a top coat layer. If a clear coat is applied in the $3^{rd}$ step, then a fourth step may include the application of a hard top coat layer 20b to the clear coat layer. A clear coat layer may be applied to a card assembly and cured as discussed above. Likewise, a hard top coat layer may be applied to a card assembly and cured as discussed above.

In practicing the invention, a clear coat layer or a top coat layer may be applied to an exposed metal surface. If a clear coat is applied first, a top coat layer can then be applied to the clear coat layer. In a hybrid card, it is not necessary to have an ESD protective coating over the plastic assembly. However, if it is decided to do so, then a clear coat layer or a top coat layer may be applied over the plastic assembly. As in the case of metal card, if a clear coat is applied first, a top coat layer can then be applied to the clear coat layer.

Typically, a fifth step includes affixing a signature panel 401 above and on the outside of any protective coating because the signature panel needs to be on the outside. Generally a hologram 403 may be affixed to the card at the same time as the signature panel. However, note that the hologram can be affixed before or after the application of a clear coat and/or a hard coat. Also, a contact chip 202 may need to be attached after the application of a top coat to enable the chip to make physical contact with a POS device.

Cards embodying the invention may be formed with a metal core as shown in FIGS. 5A to 5G.

Figure 5A:
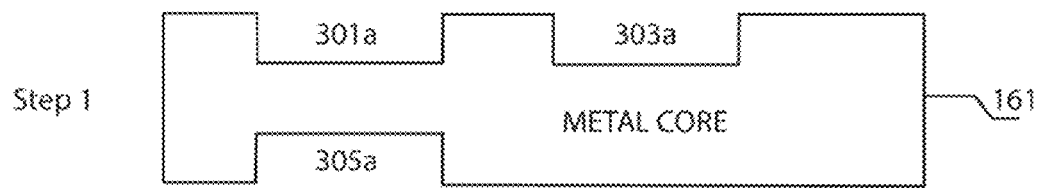
FIGS. 5A to 5G are simplified cross-sectional diagrams of a metal core card embodying the invention.
Figure 5B:
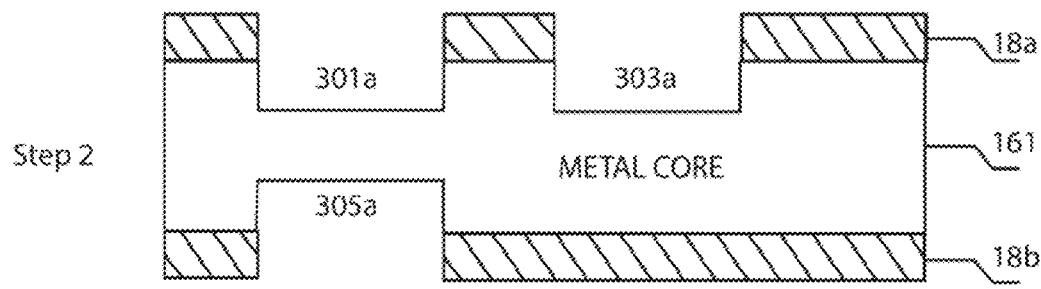

A. Cards embodying the invention may have a metal core 161 as shown in FIG. 5A.
B. During a first step the metal core 161 may be machined to form pockets (cut outs). By way of example, three cut-outs (301a, 303a, 305a) are shown in FIG. 5A.
C. During, and as part of, a second step, as shown in FIG. 5B, clear coat layers 18a, 18b are formed above and below the metal core. The clear coat layers 18a, 18b, as described above, may be an acrylic resin, or any like material, which functions to insulate the metal layer from making contact with a POS device thereby preventing ESD or the possibility of a short circuit. As above, the clear coat resin layer may be applied (or formed) by spraying, screen printing, painting, powder coating or any other like method, and cured (processed) by UV cure, electron beam cure, oven heat, or any radiation curing method or in any other suitable manner. The clear coat layer is intended to prevent ESD, short circuits and to also prevent the metal from tarnishing.

Figure 5C:
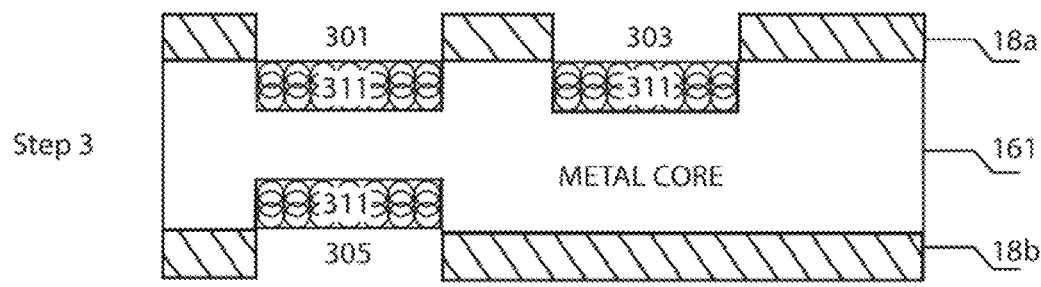

D. During and as part of a third step, as shown in FIG. 5C, appropriate adhesive (such as acrylic, solid urethane, EEA/EVA, acrylic acid modified polyolefins) and insert materials 311 (e.g., such as PVC, PET ABS, Styrenics) are added to the cut outs 301a, 303a, 305a to enable the subsequent insertion and adhesion of selected inserts such as a magnetic stripe, a signature panel and a hologram.

Figure 5D:
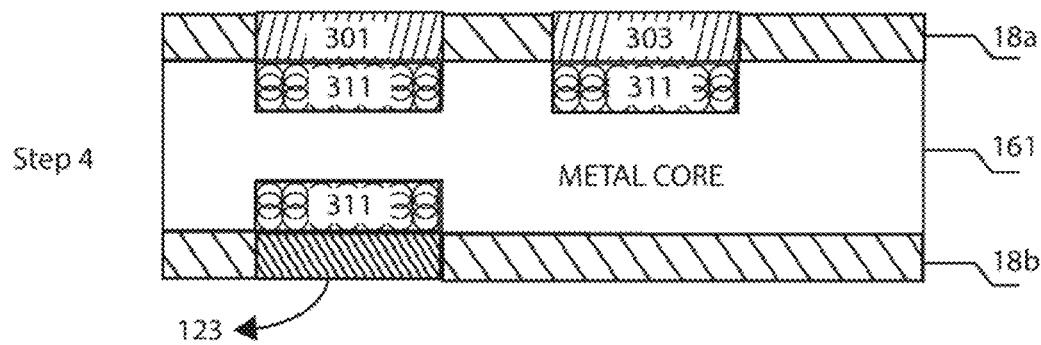
Figure 5E:
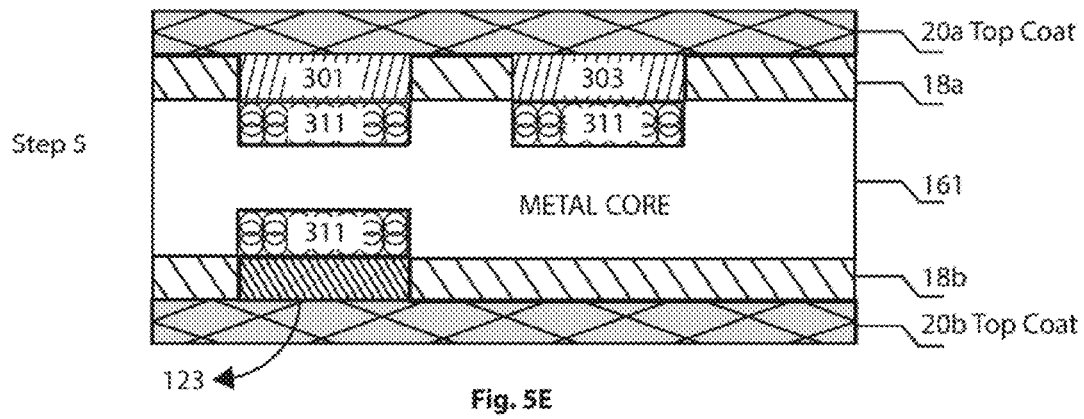

E. During and as part of a fourth step, as shown in FIG. 5D, a magnetic stripe 123 is attached within cut out 305. The insertion/attachment of the magnetic stripe may be done by stamping. A hologram 403 may also be attached within cut out 303. However, it may also be done at a later step.

F. During and as part of a fifth step, "hard" top coat layers 20a, 20b are applied to both top and bottom surfaces of the card assembly. As discussed above, the top coat layer (20a, 20b) may be formed of silicon nano-particles or any like materials. The top coat layer 20b functions to add another layer of insulation to the metal layer, in addition to the clear coat layer. Most importantly, the top coat layers 20a, 20b function to provide a protective coat which reduces wear and abrasion of the underlying clear coat. The top coat nano-particle layer 20a, 20b may be applied (or formed) and processed as discussed above.

Figure 5F:
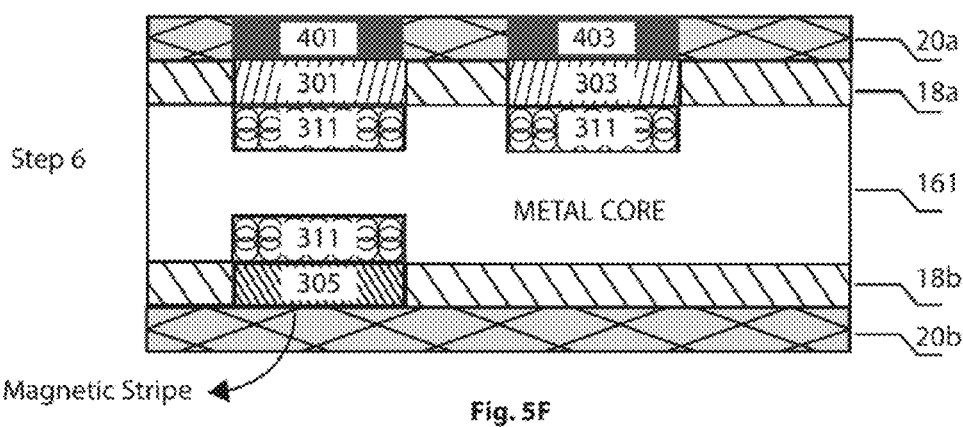

G. During and as part of a sixth step, as shown in FIG. 5F a signature panel 401 and a hologram 403 are attached to the card over layer 20a. As discussed above, the signature panel 401 usually has to be above the top coat layer to enable access to the panel. The hologram may be applied at several different stages. For purpose of economy it will often be applied at the same time as the signature panel.

A metal card formed as discussed above includes a clear coat layer and a hard coat layer to provide two levels of electrical insulation as well as wear and tear and abrasion resistance of the underlying metal surfaces.

Figure 5G:
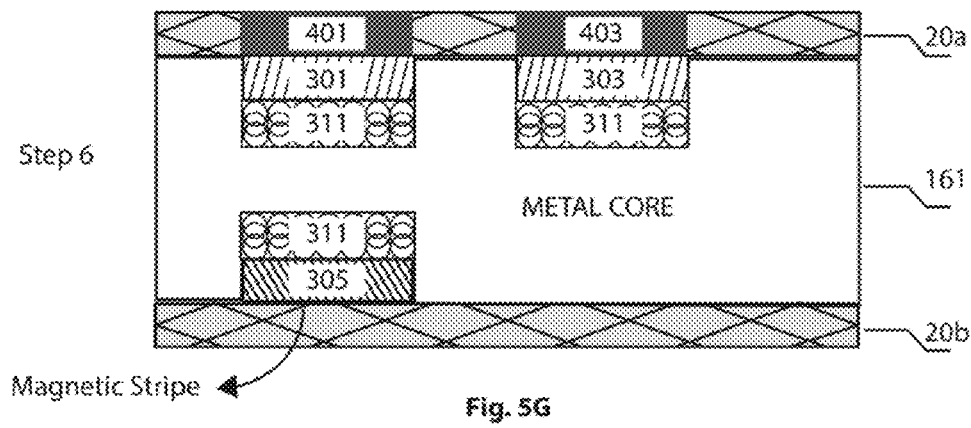

FIG. 5G is provided to illustrate that a full metal card can be made with only top coat layers 20a and 20b to provide ESD protection and abrasion resistance.

Figure 6:
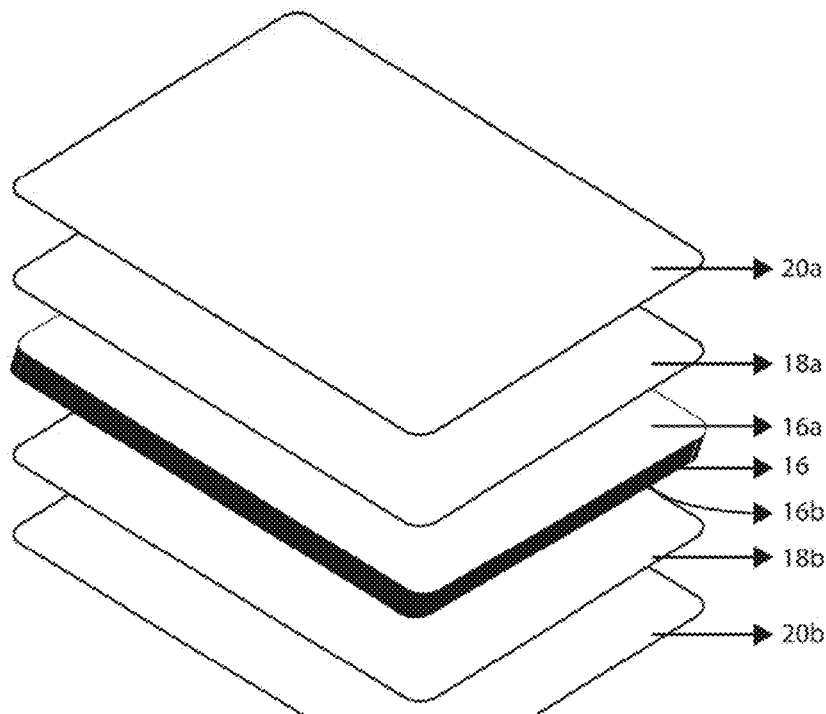
FIGS. 6 and 6A are simplified isometric diagrams of cards formed of various layers in accordance with the invention.
Figure 6A:
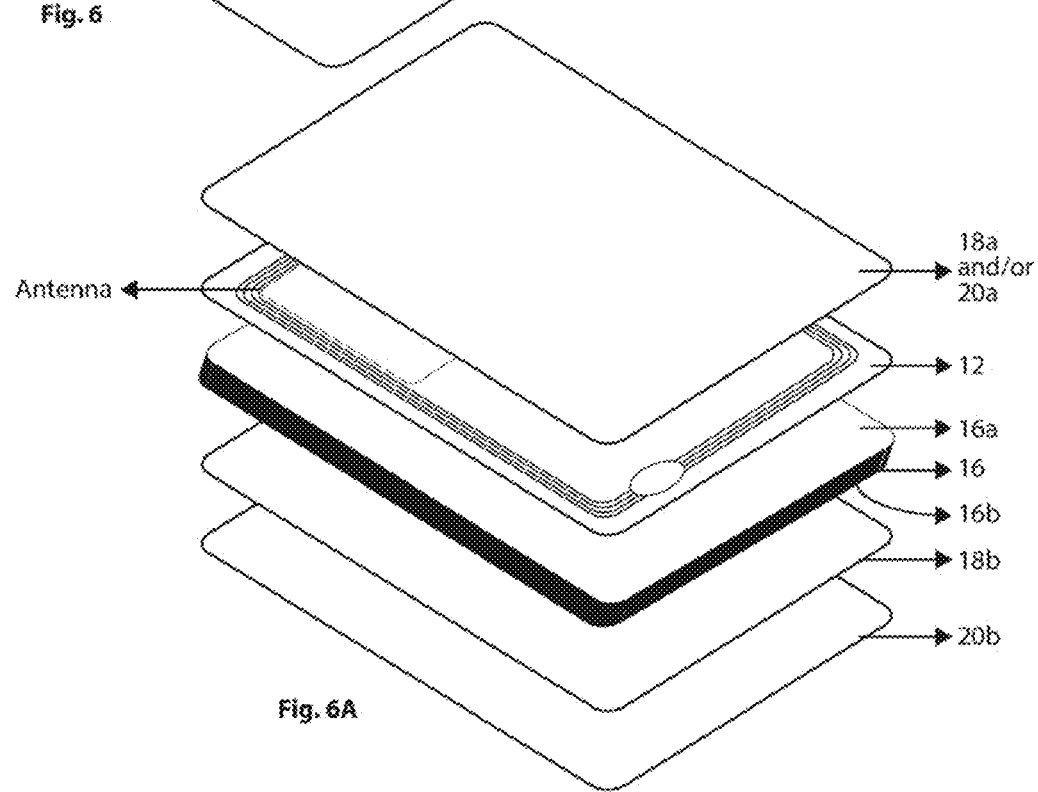

FIGS. 6 and 6A are provided to illustrate that various layers can be stacked to form metal core card (FIG. 6) or a hybrid card (FIG. 6A). Protection against ESD discharged is provided for the planar surfaces (i.e., the top and bottom surfaces). In FIG. 6, metal core 16 is shown with a top surface 16a and a bottom surface 16b. Protective layers 18a, 20a are mounted above surface 16a and protective layers 18b, 20b are mounted below surface 16b. In FIG. 6A metal layer 16 is laminated with assembly 12, as discussed above, and an antenna is shown winding around the periphery of a layer of assembly 12. So that above surface 16a there is an assembly 12 with layers 18a and/or 20a. Protective layers 18b, 20b are mounted below surface 16b. Note that the edge outer peripheral side of layer 16 can be cut back so that the outer edge of metal layer 16 would also not come into contact with any other surface.

What is claimed is:

1. A card comprising:
   a layer of non-magnetic electrically conductive material having an inner surface and outer surface; said inner and outer surfaces being generally planar and parallel to each other;
   a first assembly of electrically non-conductive material attached to the inner surface of the layer of non-magnetic electrically conductive material; and
   an electrically non-conducting protective coating overlying said outer surface for preventing said outer surface from making direct contact with any other surface; and wherein said protective coating forms the outer layer of the card and includes the following: (a) a clear coat layer of resin to provide electrical insulation to any surface it overlies; and (b) a hard top coat layer of electrically nonconductive nanoparticles in direct contact with and overlying the clear coat layer to provide both additional electrical insulation and protection against wear and tear and scratching to any surface it overlies; and wherein said clear coat layer and said hard top coat layer form the two outer layers of said card.

2. The card as claimed in claim 1 wherein the resin of the clear coat layer may be from any of the following an acrylic resin including, but not limited to, any of numerous thermoplastic or thermosetting polymers or copolymers of acrylic acid, methacrylic acid, esters of these acids, or acrylonitrile, an ultra violet (UV) curable resin blend including polyester, urethane, diol and carboxyl acrylates with ceramic particles, multifunctional acrylate, polymers or any like material; wherein the clear coat resin layer may be applied by spraying, screen printing, painting, powder coating; and wherein the clear coat layer may be processed by ultra violet (UV) curing, electron beam curing, oven heat, any suitable radiation curing method;
   wherein said layer of non-magnetic electrically conductive material is a metal layer; and
   wherein said card includes at least one of the following an RFID chip or a direct contact chip.

3. The card as claimed in claim 2 wherein the thickness of the clear coat layer may be in the range of 3 microns to 25 microns.

4. The card as claimed in claim 1, wherein the hard top coat layer of nano-parrticles includes a nano-particle layer formed from any of the following: silicon nano-particles, ceramics, any hard, electrically non-conductive, materials, or any hard particles; and wherein the top coat layer may be applied by atomizing, spraying, painting, roll coating, screen printing, or thermal transfer; and wherein the top coat layer may be processed by conventional automotive type spray guns, brushes, screen printing equipment, or roll lamination.

5. The card as claimed in claim 4 wherein the thickness of the hard top coat nano-particle layer may be in the range of 1.5 to 15 microns.

6. The card as claimed in claim 1 wherein the hard top coat layer of nano-particles provides a protective coat which reduces wear and abrasion of the underlying clear coat and wherein the hard top coat layer also functions to add another layer of insulation to the electrically conductive material layer.

7. A card as claimed in claim 1 wherein said electrically non-conducting protective coating overlying said outer surface is a first electrically non-conducting protective coating; and wherein said first assembly of electrically non-conductive material includes a second electrically non-conducting protective coating overlying said inner surface for preventing said inner surface from making direct contact with any other surface; and wherein said second protective coating includes at least one of the following: (a) a second clear coat layer of resin; or (b) a second hard top coat layer of nano-particles.

8. A card as claimed in claim 1 wherein said first assembly of electrically non-conductive material includes a clear coat layer of resin overlying said inner surface of the layer of electrically conductive material and a top coat layer of nano-particles in direct contact with and overlying said clear coat layer overlying said inner surface.

9. The card as claimed in claim 1 wherein said first assembly includes at least two layers of plastic material which are laminated together and pre-shrunk at a first temperature and at a first pressure, and wherein said first assembly is attached via an adhesive layer to the inner surface of the electrically conductive material layer and wherein the electrically conductive material layer and the first assembly form a second assembly which is laminated at a temperature which is less than the first temperature.

10. The card as claimed in claim 9 further including an additional protective coating overlying said first assembly; said additional protective coating including at least one of the following: (a) an additional clear coat layer of resin; and (b) an additional hard top coat layer of nano-particles.

11. A card comprising:
a layer of electrically conductive metal having an inner surface and outer surface; said inner and outer surfaces being generally planar and parallel to each other;
a first electrically non-conducting protective coating overlying said inner surface for preventing said inner surface from making direct contact with any other surface;
a second electrically non-conducting protective coating overlying said outer surface for preventing said outer surface from making direct contact with any other surface;
wherein said first protective coating includes the following: (a) a first clear coat layer of resin; and (b) a first hard top coat layer of nano-particles; and
wherein said second protective coating includes at least one of the following: (a) a second clear coat layer of resin to provide electrical insulation to any surface it overlies; or (b) a second hard top coat layer of nano-particles to provide both electrical insulation and protection against wear and tear to any surface it overlies.

12. The card as claimed in claim 11 wherein said first electrically non-conducting protective coating includes a first clear coat layer of resin overlying said inner surface and a first hard top coat layer overlying said first clear coat layer; and wherein said second electrically non-conducting protective coating includes a second clear coat layer of resin overlying said outer surface and a second hard top coat layer overlying said second clear coat layer; and wherein said card includes an RFID chip or a direct contact chip.

13. The card as claimed in claim 11 wherein
(a) the resin of each clear coat layer may be from any of the following an acrylic resin including, but not limited to, any of numerous thermoplastic or thermosetting polymers or copolymers of acrylic acid, methacrylic acid, esters of these acids, or acrylonitrile, an ultra violet (UV) curable resin blend including polyester, urethane, diol and carboxyl acrylates with ceramic particles, multifunctional acrylate, polymers or any like material; wherein the clear coat resin layer may be applied by spraying, screen printing, painting, powder coating; and wherein the clear coat layer may be processed by ultra violet (UV) curing, electron beam curing, oven heat, a radiation curing method; and
(b) wherein each one of said first and second hard top coat layer includes a nano-particle layer formed from any of the following: silicon particles, ceramics, any hard, electrically non-conductive, materials, or any hard particles; and wherein the top coat layer may be applied by atomizing, spraying, painting, roll coating, screen printing, or thermal transfer; and wherein the top coat layer may be processed by conventional automotive type spray guns, brushes, screen printing equipment, or roll lamination.

14. The card as claimed in claim 13 wherein said layer of electrically conductive material is a layer of metal; wherein the thickness of each one of said clear coat resin layer is in the range of 3 microns to 25 microns; and wherein the thickness of each one of said hard top coat layers is in the range of 1.5 to 15 microns.

15. A card comprising:
a first assembly comprised of multiple different plastic layers which have been laminated at a first temperature and pressure to pre shrink the layers and reduce their subsequent dimensional changes; said first assembly having an inner surface and an outer surface; the outer surface defining one of the top and bottom side of the card;
a layer of electrically conductive material having an inner surface and an outer surface; said inner and outer surfaces being generally planar and parallel to each other;
the inner surface of the layer of electrically conductive material being attached to the inner surface of the first assembly via an adhesive layer; and
an electrically non-conducting protective coating overlying said outer surface of said layer of electrically conductive material for preventing said outer surface of said layer of electrically conductive material from making direct contact with any other surface; and wherein said protective coating includes the following: (a) a clear coat layer of resin to provide electrical insulation to any surface it overlies; and (b) a hard top coat layer of nano-particles in direct contact with and overlying said clear coat layer to provide both electrical insulation and protection against wear and tear to any surface it overlies and wherein said clear coat layer and said hard top coat layer form the outer layers of the card; and wherein said card includes at least one of an RFID chip or a direct contact chip.

16. The card as claimed in claim 15 wherein said layer of electrically conductive material is a metal.

17. The card as claimed in claim 15 further including an additional electrically non-conducting protective coating overlying said first assembly; wherein said additional electrically non-conducting protective coating includes at least one of the following: (a) a clear coat layer of resin; or (b) a hard top coat layer; wherein said clear coat layer functions to provide electrical insulation to any surface it overlies and said hard top coat layer functions to provide both electrical insulation and protection against wear and tear to any surface it overlies.

18. A method of making a card which includes an electrically conductive material layer having top and bottom surfaces generally parallel to each other, comprising the steps of:
attaching a first assembly of electrically non-conductive material to the top surface of the layer of electrically conductive material; and
forming an electrically non-conducting protective coating overlying said bottom surface for preventing said bottom surface from making direct contact with any other surface including the following: (a) a clear coat layer of resin to electrically insulate any surface it overlies; and (b) a hard top coat layer of nano-particles formed over and in direct contact with said clear coat layer to provide both electrical insulation and abrasion resistance to any surface it overlies and forming the outer layers of the card.

19. The method of making a card as claimed in claim 18, wherein the resin of the clear coat layer includes any of the following an acrylic resin including, but not limited to, any of numerous thermoplastic or thermosetting polymers or copolymers of acrylic acid, methacrylic acid, esters of these acids, or acrylonitrile, an ultra violet (UV) curable resin blend including polyester, urethane, diol and carboxyl acrylates with ceramic particles, multifunctional acrylate, polymers or any like material; and wherein the step of attaching an electrically non-conducting protective coating overlying said bottom surface includes:

(a) applying the clear coat resin layer by any of the following: spraying, screen printing, painting, powder coating; and (b) curing the clear coat layer by any of the following ultra violet (UV) curing, electron beam curing, oven heat, and any radiation curing method.

20. The method of making a card as claimed in claim 18, wherein the hard top coat layer includes a nano-particle layer formed from any of the following: silicon nano-particles, ceramics, any hard, electrically non-conductive, materials, or any hard particles; and wherein the step of attaching an electrically non-conducting protective coating overlying said bottom surface includes:

(a) applying the top coat layer by any of the following atomizing, spraying, painting, roll coating, screen printing, thermal transfer; and (b) processing the top coat layer by conventional automotive type spray guns, brushes, screen printing equipment, or roll lamination.

21. The method of making a card as claimed in claim 18, wherein the step of attaching an electrically non-conducting protective coating overlying said bottom surface includes:

applying the clear coat layer of resin overlying the bottom surface; and applying the hard top coat layer overlying the clear coat layer and wherein the hard top coat layer includes nano-particles which function to provide a protective coat which reduces wear and abrasion of the underlying clear coat and wherein the hard top coat layer also functions to add another layer of electrical insulation to the electrically conductive material layer.

22. The method of making a card as claimed in claim 18, wherein the step of attaching a first assembly of electrically non-conductive material to the top surface of the layer of electrically conductive material includes:

forming said first assembly of electrically non-conductive material to produce an additional electrically non-conducting protective coating overlying said top surface for preventing said top from making direct contact with any other surface; and wherein said additional electrically non-conducting protective coating also includes at least one of the following: (a) an additional clear coat layer of resin; or (b) an additional hard top coat layer of nano-particles.

23. The method of making a card as claimed in claim 18, wherein the step of attaching a first assembly of electrically non-conductive material to the top surface of the layer of electrically conductive material includes:

forming said first assembly to include at least two layers of plastic material which are laminated together and pre-shrunk at a first temperature and at a first pressure, and wherein said first assembly is attached via an adhesive layer to the top surface of the electrically conductive material layer and wherein the electrically conductive material layer and the first assembly form a second assembly which is laminated at a temperature which is less than the first temperature.

24. The method of making a card as claimed in claim 23, further including forming an additional protective coating overlying said first assembly; said additional protective coating including at least one of the following: (a) an additional clear coat layer of resin; or (b) an additional hard top coat layer.

\* \* \* \* \*